US010090609B2

(12) United States Patent
Foley et al.

(10) Patent No.: US 10,090,609 B2
(45) Date of Patent: Oct. 2, 2018

(54) GROUNDING MODULE HAVING EXTERNAL COAXIAL CABLE GROUND LUG

(71) Applicant: Tii Technologies Inc., Edgewood, NY (US)

(72) Inventors: David E. Foley, Manhattan Beach, CA (US); Walter Fay, Smithtown, NY (US)

(73) Assignee: Tii Technologies Inc., Edgewood, NY (US)

( * ) Notice: Subject to any disclaimer, the term of this patent is extended or adjusted under 35 U.S.C. 154(b) by 0 days.

(21) Appl. No.: 15/878,947

(22) Filed: Jan. 24, 2018

(65) Prior Publication Data

US 2018/0212343 A1 Jul. 26, 2018

Related U.S. Application Data

(60) Provisional application No. 62/449,809, filed on Jan. 24, 2017.

(51) Int. Cl.
*H01R 13/713* (2006.01)
*H01R 4/66* (2006.01)
(Continued)

(52) U.S. Cl.
CPC ............... *H01R 4/66* (2013.01); *H01R 4/36* (2013.01); *H01R 13/6666* (2013.01); *H01R 13/717* (2013.01); *H01R 24/525* (2013.01); *H01R 24/68* (2013.01); *H02H 9/005* (2013.01); *H01R 2103/00* (2013.01)

(58) Field of Classification Search
CPC ........ H01R 4/66; H01R 4/36; H01R 13/6666; H01R 24/525; H01R 24/68
See application file for complete search history.

(56) References Cited

U.S. PATENT DOCUMENTS 4,111,516 A * 9/1978 Wireman ............. H01R 13/648
324/508
5,383,799 A * 1/1995 Fladung ............... H01R 25/006
439/108

(Continued)

OTHER PUBLICATIONS

Tii Technologies Inc., "Grounding Module with AC Outlet".
(Continued)

*Primary Examiner* — Briggitte R Hammond
(74) *Attorney, Agent, or Firm* — Bodner & O'Rourke, LLP; Gerald T. Bodner; Christian P. Bodner (57) ABSTRACT

A grounding module for telecommunication systems is mountable to an AC wall outlet and includes two cable connectors to which signal carrying cables are attached. The grounding module includes a housing having a main ground contact to provide a ground to an external electronic device connected thereto. An external grounding lug is mounted on one of the cable connectors to provide a separate ground connection to the metallic sleeves of the cable connectors. At least one of a surge protection circuit and ground protection circuit is provided and which is in electrical communication with the main ground contact. The grounding lug and metallic sleeves of the cable connectors are selectively electrically isolatable from the main ground contact.

14 Claims, 3 Drawing Sheets

(51) Int. Cl.
    *H01R 24/68*     (2011.01)
    *H01R 24/52*     (2011.01)
    *H01R 4/36*     (2006.01)
    *H01R 13/66*     (2006.01)
    *H02H 9/00*     (2006.01)
    *H01R 13/717*     (2006.01)
    *H01R 103/00*     (2006.01)

(56) References Cited

U.S. PATENT DOCUMENTS

| | | | |
|---|---|---|---|
| 7,088,564 B1 | 8/2006 | Chaudhry | 361/42 |
| 7,142,402 B1* | 11/2006 | Chaudhry | H01R 13/7135 361/42 |
| 7,365,950 B1 | 4/2008 | Chaudhry | 361/42 |
| 2016/0020561 A1* | 1/2016 | Knauer | H01R 13/53 439/535 |
| 2016/0064883 A1* | 3/2016 | Macauda | B25F 5/00 439/40 |
| 2017/0324195 A1* | 11/2017 | Eriksen | H02H 3/00 |

OTHER PUBLICATIONS

Tii Technologies Inc., "Grounding Module with AC and Coax with AC Outlet and Coax Cable Grounding".
Tii Technologies Inc., "Installation Note".

* cited by examiner

FIG. 3 ained. Ser. No. 62/449,809, filed on Jan. 24, 2017, and
GROUNDING MODULE HAVING EXTERNAL COAXIAL CABLE GROUND LUG

CROSS-REFERENCE TO RELATED APPLICATIONS

This application is related to U.S. Provisional Patent Application Ser. No. 62/449,809, filed on Jan. 24, 2017, and entitled "Grounding Module Having External Coaxial Cable Ground Lug", the disclosure of which is hereby incorporated by reference and on which priority is hereby claimed.

BACKGROUND OF THE INVENTION

Field of the Invention

The present invention generally relates to surge suppression devices, and more particularly relates to devices that provide surge suppression to protect sensitive electronic components due to lightning strikes and crossed power lines and which minimize injury to people caused by improperly grounded AC power outlets. Even more specifically, the present invention relates to a grounding module pluggable into a standard AC wall outlet and which detects the presence of AC power and ground and which provides an auxiliary AC receptacle and ground connection.

Description of the Prior Art

Grounding modules are often used to protect sensitive electronic equipment, such as televisions, computers, set top boxes, audio components and the like. Such grounding modules are also used in conjunction with telecommunications systems to protect network interface devices (NIDs) and optical network terminals (ONTs) from power surges caused by lightning strikes or crossed power lines and to provide an adequate ground connection for the NID or ONT and to ground the metallic shields of any coaxial cables connected to the NID or ONT and distributed interiorly throughout the residential or commercial premises.

One such grounding module is Part No. 442 or 442c manufactured by Tii Technologies Inc. of Edgewood, N.Y. Some telecommunication service providers use the Tii 442 grounding module to ground installations where easy access to conventional grounding approaches may be impractical, such as in apartment buildings where the ONT may be a significant distance from an appropriate ground point.

The Tii 442c and Tii 442 grounding module are covered by one or more of U.S. Pat. No. 7,088,564 (Chaudhry), U.S. Pat. No. 7,142,402 (Chaudhry) and U.S. Pat. No. 7,365,950 (Chaudhry), each of which is owned by Tii Technologies Inc. The disclosure of each of the aforementioned patents is incorporated herein by reference.

The Tii 442c grounding module, in particular, is mountable in a conventional 120V AC wall outlet, and is designed to detect the presence of AC power and ground, and provides an auxiliary AC receptacle and ground connection. The module includes two F-type male coaxial connectors ("signal in" and "signal out") that provide a ground connection for the metallic shield or sleeve of any coaxial cable connected thereto. The Tii 442c grounding module provides additional features, including surge protection, the capability of terminating the module with an external No. 6 gauge grounding wire, and a ground detection circuit for the AC receptacle on which the module is mounted.

Internally, within the housing of the Tii 442c grounding module, the metallic outer sleeves of the "signal in" and "signal out" male coaxial connectors are electrically connected together and to the main ground contact within the grounding port situated on the housing. The grounding port receives the stripped end of an external grounding wire, the other end of which may be electrically connected to another external device to provide a ground connection for that device. This ground is derived from the AC receptacle the 442c module is plugged into. The stripped end of the ground wire is held in place within the grounding port by the user turning a terminating screw situated on the housing at the grounding port, which screw engages the ground wire and ensures a proper electrical connection between the ground wire and the main ground contact within the grounding port. This main ground contact is not only connected to the coaxial sleeves of the "signal in" and "signal out" connectors, as mentioned previously, but also to the ground of the surge protection circuit and ground detection circuit located within the housing, the ground contact of the auxiliary AC receptacle provided on the front side of the housing and the ground prong of the male AC connector provided on the rear side of the housing.

There may occur a situation where it is desired to ground the metallic sleeves of the "signal in" and "signal out" coaxial connectors externally, that is, outside the housing of the grounding module, rather than internally within the housing. The modified grounding module of the present invention is provided for this purpose.

OBJECTS AND SUMMARY OF THE INVENTION

It is an object of the present invention to provide a grounding module mountable on an AC wall outlet and having a surge protection circuit and/or a ground detection circuit, an auxiliary AC receptacle, and at least a pair of coaxial cable connectors, and which further has an external grounding lug electrically connected to the coaxial connectors for connection to a ground wire.

It is another object of the present invention to provide a grounding module having a housing and "signal in" and "signal out" coaxial connectors mounted on the housing, and further having a ground lug situated externally of the housing for connection to a ground wire for grounding an external device.

It is still another object of the present invention to provide a grounding module which separates the ground connection to at least a pair of coaxial connectors mounted on the housing of the grounding module from both the ground of a surge protection circuit and/or a ground detection circuit located within the housing of the grounding module as well as a main grounding contact located on the housing of the grounding module.

In accordance with one form of the present invention, a grounding module includes a housing defining an internal cavity, a surge protection circuit or a ground detection circuit situated within the internal cavity of the housing, one or more ground indicator lights connected to either the surge protection circuit or the ground detection circuit and situated on the housing to be viewable by a user of the grounding module, and at least a pair of coaxial cable connectors mounted on the housing and extending outwardly therefrom for connection to coaxial cables. The grounding module of the present invention further includes an external ground lug mounted on and electrically connected to at least one of the coaxial connectors.

The external ground lug may be formed integrally with one of the coaxial connectors. The lug includes a block preferably extending radially outwardly from the coaxial connector on which it is mounted, a bore formed through the thickness of the block for receiving therethrough the stripped end of a ground wire, and a terminating screw which is received in a threaded opening formed in the block that extends to the ground wire receiving bore.

In a preferred form of the invention, the grounding module may include a grounding port situated on the housing, the grounding port having an electrical contact situated therein, the grounding port being also provided to receive the stripped end of the ground wire passing through the bore of the external ground lug, if so desired by the user. Another terminating screw is mounted on the housing of the grounding module in alignment with the grounding port, which screw engages the stripped end of the external ground wire to hold it in place within the grounding port. Thus, the bore formed in the block of the external ground lug is preferably situated in alignment with the grounding port formed in the housing of the grounding module so that, if desired by the user, the stripped end of the external ground wire may be connected not only to the external lug, grounding the metallic sleeves of the coaxial connectors, but also to the main ground contact on the housing.

The grounding module of the present invention provides an internal electrical connection between the metallic sleeves of the coaxial connectors mounted thereon. Thus, a ground wire connected to the external lug will electrically connect to the metallic sleeves of both of the coaxial connectors. In accordance with the present invention, the metallic sleeves of the coaxial cables are not internally connected to the surge suppression circuit or the ground detection circuit of the grounding module, or to the main ground contact within the grounding port of the module. However, should the user of the grounding module desire to make such an electrical connection between the coaxial connectors and the circuitry within the grounding module, he may easily strip off an additional length of insulation from the ground wire, and extend the stripped end of the ground wire through the bore formed in the block of the external lug and into the grounding port of the grounding module. In this manner, the metallic sleeves of the coaxial connectors, and the surge protection circuit or ground detection circuit of the grounding module are electrically connected to the external ground wire, the other end of which may be connected to and provide a ground connection for an external device. Alternatively, a short jumper wire having opposite stripped ends may be electrically connected to the external ground lug and the grounding port contact on the module so that the sleeves of the coaxial connectors on the module are now grounded with the other ground connections of the circuitry within the module and with the ground provided by the AC receptacle into which the module is plugged.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 2:
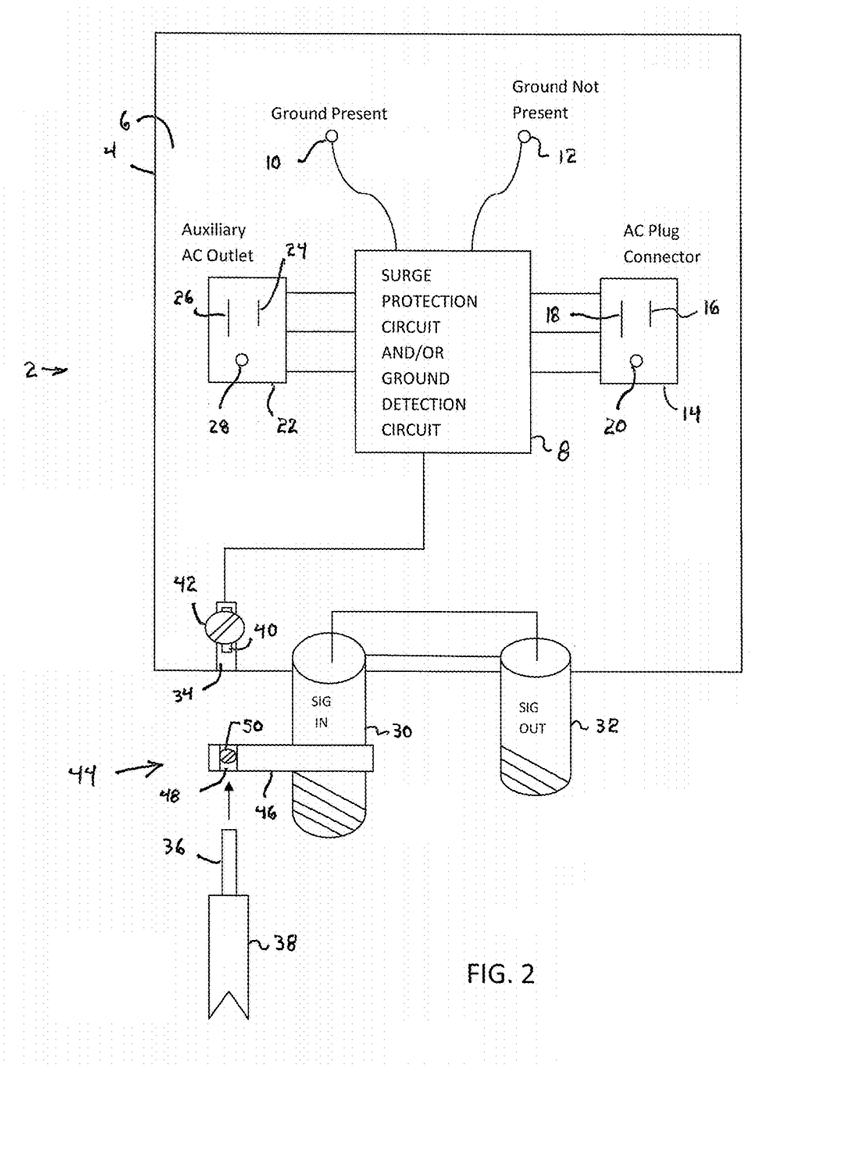
FIG. 2 is a block diagram of the electrical circuitry of the grounding module of the present invention.

Reference should be had first to FIG. 2 of the drawings, which illustrates the circuit or circuits used in the grounding module 2 of the present invention. As can be seen from FIG. 2, the grounding module 2 of the present invention includes a housing 4 defining an interior cavity 6 in which either a surge protection circuit or a ground detection circuit 8, or both, on a printed circuit board, are situated. The surge protection circuit and the ground detection circuit 8 may be any one of the circuits disclosed in the aforementioned U.S. Pat. Nos. 7,088,564; 7,142,402; and 7,365,950. If a ground detection circuit 8 is used, the circuit is electrically connected to at least two indicators 10, 12, such as light emitting diodes (LEDs), mounted on the housing 4 of the grounding module 2. One indicator 10, which is preferably green in color, when illuminated, indicates the presence of ground in the wall outlet on which the grounding module 2 is mounted. A second indicator 12, which is preferably red in color, when illuminated, indicates that there is a problem with a ground connection. When both the ground present indicator 10 and the ground not present indicator 12 are illuminated simultaneously, this indicates that there is a problem with the electrical wiring servicing the AC receptacle into which the grounding module 2 is plugged.

For plugging the grounding module 2 of the present invention into a conventional wall outlet, an AC plug connector 14 consisting of a male line ("hot") contact 16, a male neutral contact 18 and a ground prong 20 extends outwardly from the rear side of the housing 4 of the grounding module 2. The contacts 16, 18 and ground prong 20 of the plug connector 14 are electrically connected to the surge protection circuit and/or the ground detection circuit 8 of the grounding module 2.

An auxiliary AC outlet 22, consisting of female line and neutral contacts 24, 26 and a female ground contact 28, is mounted on the front side of the housing 4 of the grounding module 2 so as to be accessible by a user, and the contacts 24, 26, 28 of the auxiliary outlet 22 are electrically connected to the surge protection circuit and/or the ground detection circuit 8 of the module 2.

On a lateral side of the housing 4 of the grounding module 2 of the present invention are located at least two F-type male coaxial cable connectors 30, 32. The coaxial connectors 30, 32 extend outwardly from the lateral side of the housing 4 on which they are mounted, and each includes a threaded free end so that a coaxial cable may be connected to each connector 30, 32. One coaxial connector 30 is referred to herein as the "signal in" connector, and the other coaxial connector 32 is referred to herein as the "signal out" connector. The connectors 30, 32 are mounted to a printed circuit board carrying the surge protection circuit and/or the ground detection circuit 8 within the interior cavity 6 of the module 2. The inner conductors of each connector 30, 32 are electrically connected together, and the metallic sleeve of each connector 30, 32 are also electrically connected together, internally of the housing 4 of the grounding module 2. Thus, the grounding module 2 provides a common ground between the "signal in" connector 30 and the "signal out" connector 32 and the coaxial cables connected to the connectors 30, 32.

There is a grounding port 34 formed in the housing 4 of the grounding module 2 and preferably situated adjacent to one of the "signal in" and "signal out" coaxial connectors 30, 32 and on the same lateral side thereof. The grounding port 34 is provided to receive the stripped end 36 of an external conductor or ground wire 38 (which is commonly designated by using a green-colored outer insulation), the other end of which may be connected to an external device to provide a ground connection to the device that is derived from the AC receptacle into which the grounding module 2 is plugged. Within the grounding port 34 is located a main ground contact 40, which is electrically connected to the surge protection circuit and/or the ground detection circuit 8, the ground prong 20 on the AC plug connector 14, and the ground contact 28 on the auxiliary AC outlet 22. A ground wire terminating screw 42 is situated in an opening formed in the housing 4 of the grounding module 2 and in alignment with the grounding port 34. The free end of the terminating screw 42 can engage the stripped end 36 of the external ground wire 38 to secure the ground wire 38 to the main ground contact 40 within the grounding port 34 and to ensure that a good electrical connection between the ground wire 38 and the main ground contact 40 is provided. The terminating screw 42 is turned by the user so that the free end of the terminating screw 42 engages the ground wire 38 and holds it fast.

As can be seen from FIG. 2 of the drawings, in the present invention of the grounding module 2, the main electrical contact 40 within the grounding port 34 of the module 2 is not connected to the metallic sleeves of the "signal in" and "signal out" coaxial connectors 30, 32. This differs from the conventional Tii 442c grounding module, where such a connection between the main electrical contact and the sleeves of the coaxial connectors is made internally of the module.

Figure 1:
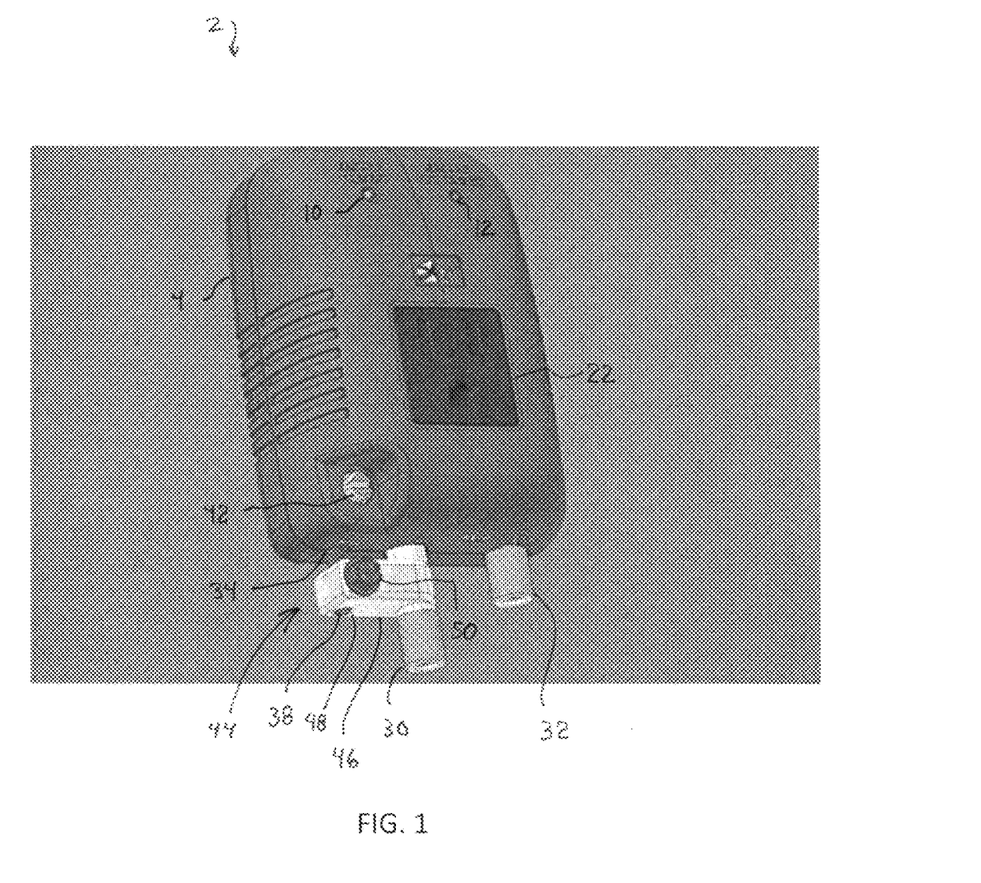
FIG. 1 is a perspective view of a grounding module formed in accordance with the present invention.

As can be seen from FIGS. 1 and 2 of the drawings, the grounding module 2 of the present invention includes an external ground lug 44 affixed to one of the "signal in" connector 30 and the "signal out" connector 32. More specifically, one of the coaxial connectors 30, 32, and preferably the "signal in" connector 30, is formed to be longer than the other coaxial connector 30, 32, in this case, the "signal out" connector 32, to permit the external ground lug 44 to be mounted thereon. The external ground lug 44 is formed generally from a block 46 of electrically conductive material, such as stainless steel, and preferably from the same material from which the coaxial connector sleeves are formed. This block 46 extends radially outwardly from the metallic sleeve of the coaxial connector 30, 32 on which it is mounted. The block 46 may be formed integrally with the connector 30, 32 or may be a separate component attachable thereto.

The block 46 of the external ground lug 44 includes a bore 48 formed through the thickness thereof, the bore 48 being preferably in alignment with the grounding port 34 situated on the housing 4 of the grounding module 2 but separated therefrom. The external ground lug 44 may further include a terminating screw 50 received in a threaded opening formed in the block 46, which opening is situated in perpendicular alignment with the axis of the external ground lug bore 48 and that of the bore of the ground wire receiving port 34. The bore 48 formed in the block 46 of the external ground lug 44 is provided for receiving the stripped end 36 of a ground wire 38. The free end of the terminating screw 50 extends into the bore 48 to engage the stripped end 36 of the ground wire 38 received thereby in order to hold the ground wire 38 in place and to ensure that a proper electrical connection is made between the ground wire 38 and the external ground lug 44.

The user of the grounding module 2 of the present invention may desire to externally (i.e., outside the module 2) electrically connect the metallic sleeves of the coaxial connectors 30, 32 and any cables connected thereto, to an external ground wire 38 by inserting the stripped end 36 of the external ground wire 38 into the bore 48 of the ground lug 44 and tightening the terminating screw 50 thereon. In this manner, the connectors 30, 32 and any coaxial cables connected thereto will be electrically connected to the ground wire 38, which may provide a ground for the connectors 30, 32 and coaxial cables, but are not electrically connected to the surge protection circuit and/or ground detection circuit 8, or the ground prong 20 and ground contact 28 of the plug connector 14 and the auxiliary outlet 22 of the module 2. Should the user of the grounding module 2 desire to connect all of the grounds together and to the external conductor or ground wire 38, he may remove further insulation from the ground wire 38 so that the stripped end 36 of the ground wire 38 passes through the bore 48 of the external ground lug 44 and is received by the grounding port 34 formed in the housing 4 of the grounding module 2 to make an electrical connection with the external ground lug 44 and the main ground contact 40 within the grounding port 34. Both terminating screws 42, 50 are turned to hold the ground wire 38 in place within the grounding port 34 and on the external ground lug 44 to secure the ground wire 38 to the module 2 and the external ground lug 44 and to ensure that a good electrical connection is made to the main ground contact 40 on the module 2 and the external ground lug 44. In this way, the metallic sleeves of the "signal in" connector 30 and the "signal out" connector 32, the ground of the surge protection circuit and/or the ground detection circuit 8, the ground prong 20 of the AC plug connector 14 and the ground contact 28 of the auxiliary AC outlet 22 are electrically connected to the external ground wire 38 and are all connected to ground through the AC receptacle into which the grounding module 2 is plugged.

Alternatively, it may be desirable to electrically jump the main ground contact 40 in the grounding port 34 of the module 2 with the external ground lug 44 so that the metallic sleeves of the coaxial connectors 30, 32 and any cables connected thereto and the grounds of the surge protection circuit and/or ground detection circuit 8, and the grounds of the AC plug connector 14 and the auxiliary AC outlet 22 are all electrically connected together. The user may simply use a short conductor or jumper wire that bridges the space between the grounding port 34 of the module 2 and the external ground lug 44, without having a ground wire 38 extend beyond the external ground lug 44. In this manner, the grounding module 2 of the present invention will function in a similar manner to that of the aforementioned Tii 442c grounding module.

Figure 3:
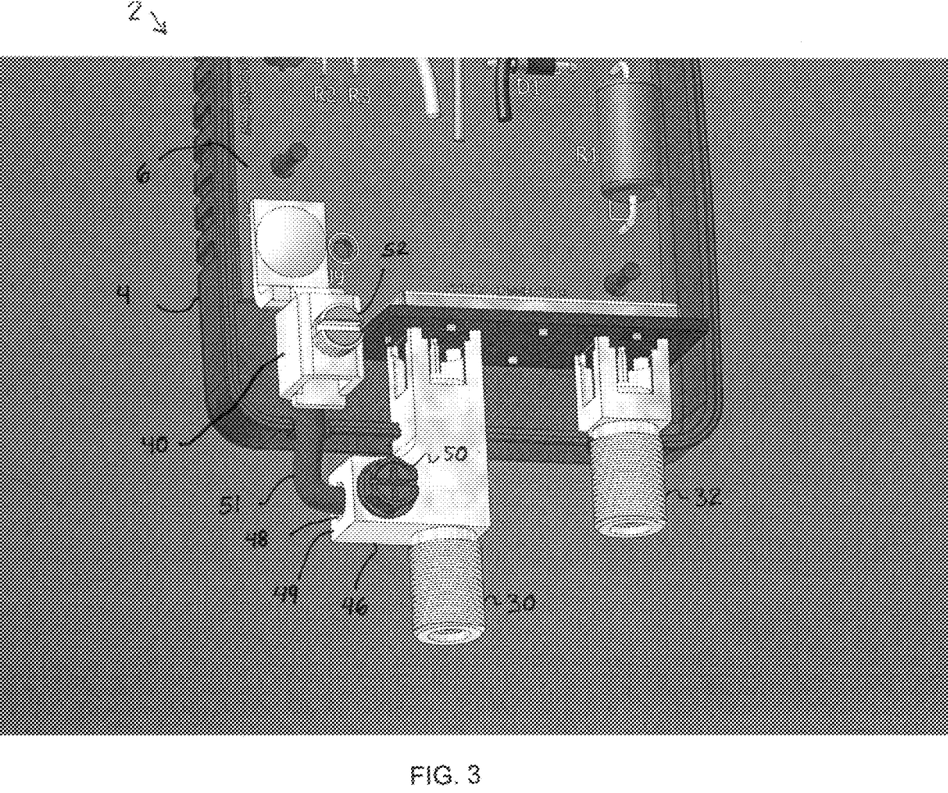
FIG. 3 is a perspective view of a portion of an alternative form of the grounding module of the present invention, with the module cover removed.

Another form of a grounding module 2 constructed in accordance with the present invention is shown in FIG. 3 of the drawings. In this embodiment, the bore 48 is repositioned on the end face 49 of the block 46 joined to and radially extending outwardly from one of the coaxial connectors 30, 32. One stripped end 36 of a short jumper wire 51 is received by the bore 48 of the external ground lug 44 and secured by the terminating screw 50 in the same manner as with the earlier-described embodiment of the grounding module 2, and the other stripped end of the jumper wire 51 is received by the grounding port 34 of the grounding module 2 to electrically contact the main electrical contact 40, and is secured thereto by the terminating screw 42. All other features and components of the grounding module 2 shown in FIG. 3 are the same as or similar to the grounding module 2 shown in FIGS. 1 and 2.

With the embodiment of the grounding module 2 of the present invention shown in FIG. 3, as well as the embodiment of the grounding module 2 shown in FIGS. 1 and 2, the ground connection between the coaxial connectors 30, 32 and any coaxial cables connected thereto and the ground contact of the receptacle into which the grounding module 2 is plugged is made externally of the grounding module 2, and not interiorly within the interior cavity 6 of the grounding module 2, by using the external jumper wire 51 between the grounding port 34 and the external ground lug 44.

The grounding module 2 of the present invention provides the user with more options with respect to grounding any coaxial cables connected to the module 2 than with conventional grounding modules. The module 2 still provides either or both of surge protection and ground detection, as well as an auxiliary AC outlet 22 into which the user may plug an electronic device, as the grounding module 2 of the present invention will occupy one outlet on a dual outlet AC wall receptacle. The grounding module 2 of the present invention will protect sensitive electronic equipment from power surges and will also indicate to the user whether there is a problem with the electrical wiring of the AC receptacle on which the grounding module 2 is mounted.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A grounding module, which comprises:
a housing, the housing having a front wall, a rear wall situated opposite the front wall, and a side wall therebetween, the front wall, the rear wall and the side wall together defining an internal cavity;
an AC plug connector having AC power contacts and a ground prong mounted on and extending outwardly from the rear wall of the housing, the AC plug connector being receivable by an AC wall outlet to allow the grounding module to be mounted on and supported by the AC wall outlet;
at least one of a surge protection circuit and a ground detection circuit situated within the internal cavity of the housing and electrically coupled to the AC plug connector;
at least one auxiliary AC outlet having AC power contacts and a ground contact situated on one of the front wall and the side wall of the housing, the at least one auxiliary AC outlet being electrically coupled to the at least one of the surge protection circuit and the ground detection circuit;
a first cable connector and at least a second cable connector situated on the housing and extending outwardly therefrom, each of the first cable connector and the at least second cable connector having an inner conductor and an outer metallic sleeve to which a cable is connectable, the inner conductors of the first cable connector and the at least second cable connector being electrically coupled to one another, the metallic sleeves of the first cable connector and the at least second cable connector being electrically coupled to one another;
at least one main ground contact mounted on the housing, the main ground contact being electrically coupled to the ground prong of the AC plug connector, the ground contact of the auxiliary AC outlet and the at least one of the surge protection circuit and the ground detection circuit, the at least one ground contact not being electrically coupled to the metallic sleeves of the first cable connector and the at least second cable connector; and
at least one external ground lug situated on and in electrical communication with the metallic sleeve of at least one of the first cable connector and the at least second cable connector and being outside of and external to the housing, the external ground lug defining an electrical contact for electrically attaching thereto an external ground jumper or wire.

2. A grounding module as defined by claim 1, which further comprises:
at least one external ground jumper, the external ground jumper being disposed outside of and external to the housing, the external ground jumper being electrically connected to the electrical contact of the external ground lug and the main ground contact of the module, thereby electrically connecting together the metallic sleeves of the first cable connector and the at least second cable connector, the ground prong of the AC plug connector, the ground contact of the auxiliary AC outlet and the at least one of the surge protection circuit and the ground detection circuit.

3. A grounding module as defined by claim 1, which further comprises:
at least one external ground wire, the external ground wire being disposed outside of and external to the housing, the external ground wire being electrically connected to the electrical contact of the external ground lug and a ground contact of an external electronic component, thereby electrically connecting the ground contact of the external electrical component with the metallic sleeves of the first cable connector and the at least second cable connector.

4. A grounding module as defined by claim 1, which further comprises:
at least one external ground wire, the external ground wire being disposed outside of and external to the housing, the external ground wire being electrically connected to the main ground contact of the housing and a ground contact of an external electronic component, thereby electrically connecting the ground contact of the external electrical component with the ground prong of the AC plug connector, the ground contact of the auxiliary AC outlet and the at least one of the surge protection circuit and the ground detection circuit.

5. A grounding module as defined by claim 1, wherein the external ground lug includes an electrically conductive block member, the electrically conductive block member extending outwardly from and being electrically connected to the metallic sleeve of one of the first cable connector and the at least second cable connector, the electrically conductive block member having a bore formed therein for receiving and electrically attaching thereto the external ground jumper or wire, the electrically conductive block member of the external ground lug being spaced apart and electrically isolated from the main ground contact located within the grounding port formed in the housing.

6. A grounding module as defined by claim 5, wherein the block member of the external ground lug is formed integrally with the metallic sleeve of one of the first cable connector and the at least second cable connector.

7. A grounding module as defined by claim 1, wherein the housing of the module further includes a grounding port formed through the thickness thereof, the grounding port having located therein the main ground contact; and wherein the external ground lug includes an electrically conductive block member, the electrically conductive block member extending outwardly from and electrically connected to the metallic sleeve of one of the first cable connector and the at least second cable connector, the electrically conductive block member having a bore formed through the thickness thereof for receiving and electrically attaching thereto the external ground jumper or wire, the electrically conductive block member of the external ground lug being spaced apart and electrically isolated from the main ground contact located within the grounding port formed in the housing.

8. A grounding module as defined by claim 1, wherein the housing of the module further includes a grounding port formed through the thickness thereof, the grounding port having located therein the main ground contact; and
  wherein the external ground lug includes an electrically conductive block member, the electrically conductive block member extending outwardly from and electrically connected to the metallic sleeve of one of the first cable connector and the at least second cable connector, the electrically conductive block member having a bore formed through the thickness thereof for receiving and electrically attaching thereto the external ground jumper or wire, the bore formed in the block member of the external ground lug being in alignment with the grounding port formed in the housing of the module.

9. A grounding module as defined by claim 1, wherein the housing of the module further includes a grounding port formed through the thickness thereof and defining an axis, the grounding port having located therein the main ground contact;
  wherein the external ground lug includes an electrically conductive block member, the electrically conductive block member extending outwardly from and electrically connected to the metallic sleeve of one of the first cable connector and the at least second cable connector, the electrically conductive block member having a bore formed therein for receiving and electrically attaching thereto the external ground jumper or wire, the bore formed in the block member of the external ground lug defining an axis; and
  wherein the axis of the bore formed in the block member of the external ground lug is disposed perpendicularly to the axis of the grounding port formed in the housing.

10. A grounding module as defined by claim 1, which further comprises:
  an external ground conductor disposed outside of and external to the housing, the external ground conductor having a first axial end and an oppositely disposed second axial end, the first axial end of the external ground conductor being selectively engageable with and electrically coupleable to one or both of the main ground contact of the housing and the electrical contact of the external ground lug, the second axial end of the external ground conductor being engageable with and electrically coupleable to an external ground connection;
  wherein, when the first axial end of the external ground conductor is electrically coupled to the main ground contact of the housing and not electrically coupled to the electrical contact of the external ground lug, and the second axial end of the external ground conductor is electrically coupled to the external ground connection, the external ground connection is electrically coupled to the ground prong of the AC plug connector, the ground contact of the auxiliary AC outlet and the at least one of the surge protection circuit and the ground detection circuit and is not electrically coupled to the metallic sleeves of the first cable connector and the at least second cable connector;
  wherein, when the first axial end of the external ground conductor is electrically coupled to the electrical contact of the external ground lug and not electrically coupled to the main ground contact of the housing, and the second axial end of the external ground conductor is electrically coupled to the external ground connection, the external ground connection is electrically coupled to the metallic sleeves of the first cable connector and the at least second cable connector and is not electrically coupled to the ground prong of the AC plug connector, the ground contact of the auxiliary AC outlet and the at least one of the surge protection circuit and the ground detection circuit; and
  wherein, when the first axial end of the external ground conductor is electrically coupled to both of the main ground contact of the housing and the electrical contact of the external ground lug, and the second axial end of the external ground conductor is electrically coupled to the external ground connection, the external ground connection is electrically coupled to the ground prong of the AC plug connector, the ground contact of the auxiliary AC outlet, the at least one of the surge protection circuit and the ground detection circuit and the metallic sleeves of the first cable connector and the at least second cable connector.

11. A grounding module as defined by claim 1, which further comprises:
  a first terminating screw, the first terminating screw being mounted on the housing and situated thereon in alignment with the main ground contact, the first terminating screw and the main ground contact defining a space therebetween for receiving the external ground jumper or wire; and
  a second terminating screw, the second terminating screw being mounted on the external ground lug and situated thereon in alignment with the electrical contact thereof, the second terminating screw and the electrical contact of the external ground lug defining a space therebetween for receiving the external ground jumper or wire.

12. A grounding module as defined by claim 1, wherein each of the first cable connector and the at least second cable connector is formed as a coaxial cable connector; and
  wherein each metallic sleeve of the first cable connector and the at least second cable connector includes a threaded free end which can threadingly engage an external coaxial cable.

13. A grounding module as defined by claim 1, wherein the first cable connector defines an input signal connector;
  wherein the at least second cable connector defines an output signal connector; and
  wherein the external ground lug is mounted on the input signal, first cable connector.

14. A grounding module as defined by claim 1, which further comprises:
  at least one indicator light mounted on the housing and viewable by a user of the grounding module; and
  wherein the at least one of the surge protection circuit and the ground detection circuit includes the ground detection circuit, the at least one indicator light being electrically coupled to the ground detection circuit, the ground detection circuit selectively generating a signal, the signal being provided to and received by the at least one indicator light, the at least one indicator light illuminating in response to the signal received from the ground detection circuit.

\* \* \* \* \*